United States Patent [19]

Finley

[11] 3,732,399

[45] May 8, 1973

[54] COMBINED OVAL SLIDE RULE AND NOMOGRAPH

[76] Inventor: Donald G. Finley, 1658 Morse Drive, San Pedro, Calif. 90732

[22] Filed: Feb. 28, 1972

[21] Appl. No.: 229,945

[52] U.S. Cl. ................235/61 B, 235/88, 235/89 R
[51] Int. Cl. .............................................G06k 1/00
[58] Field of Search ....................235/61 B, 88, 89, 235/61 NV, 61 S, 61 A, 70 R, 70 A, 70 C,

[56] References Cited

UNITED STATES PATENTS

| | | | |
|---|---|---|---|
| 944,437 | 12/1909 | Hill, Jr. | 235/61 B |
| 2,425,097 | 8/1947 | Isom | 235/61 B |
| 1,157,043 | 10/1915 | Richmond | 135/61 B |
| 1,492,046 | 4/1924 | Prindville | 235/61 B |
| 3,013,720 | 12/1961 | Steinkoenig | 235/78 |
| 3,512,709 | 5/1970 | Schneible | 235/78 |

Primary Examiner—Richard B. Wilkinson
Assistant Examiner—U. Weldon
Attorney—Robert Berliner et al.

[57] ABSTRACT

A calculating device comprising a flat generally oval-shaped card member having a perimeter defining somewhat semicircular sections interconnected by a central elongated section. The central section is formed of a generally straight periphery. A pair of indicating arms are rotatable about a pivot point on the member. The pivot point may be along the longitudinal axis of the card member, and offset from the center of the member. In addition, a scale may be printed on one side of the periphery of the member. Moreover, the semicircular sections can be identical in size, and a scale printed on the other side of the member and adjacent the periphery of the member may be the reciprocal of the scale on the first side. In addition, the calculating device may be used as a loan payment computer for determining the periodic payments due on a predetermined loan. By providing the card member with a plurality of interest rate curves which are juxtaposed with a plurality of loan duration curves, the scale may be representative of periodic payments. Thus, by positioning one of the indicia arms at the intersection of the desired interest rate and loan duration, the resultant position on the scale would be representative of the periodic payment for the intersecting interest rate and loan duration.

5 Claims, 6 Drawing Figures

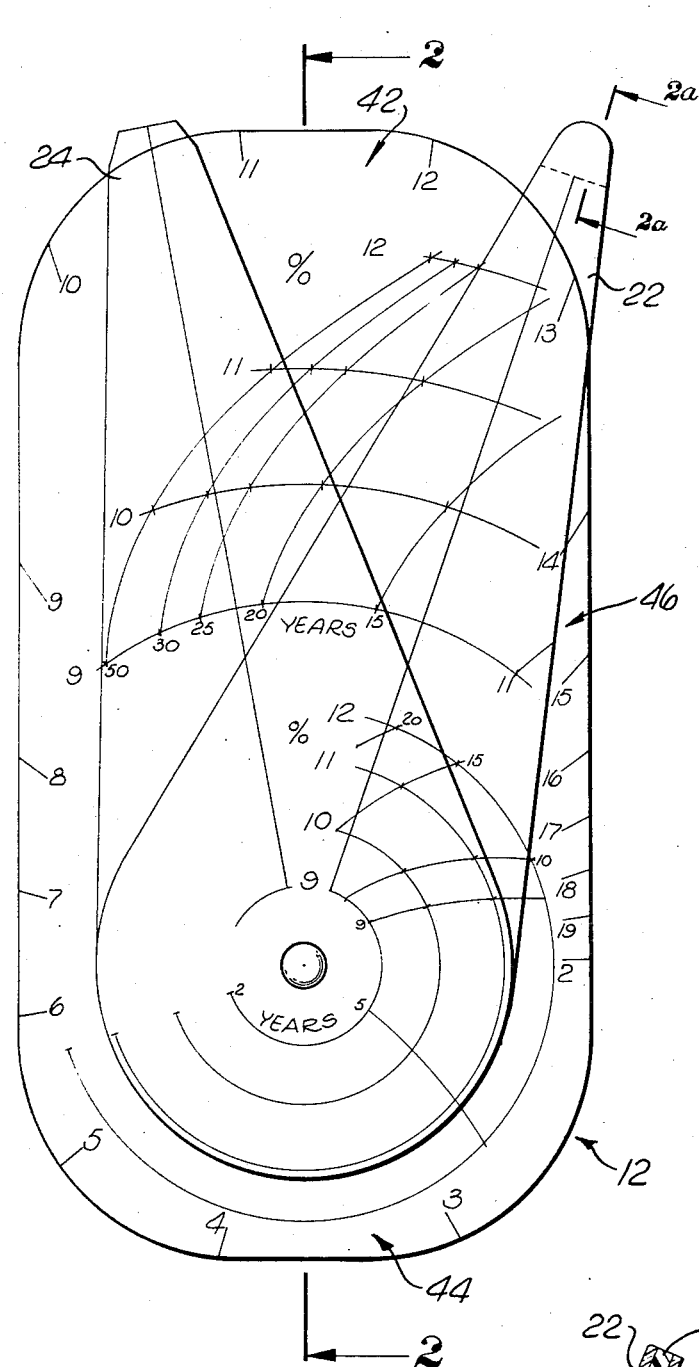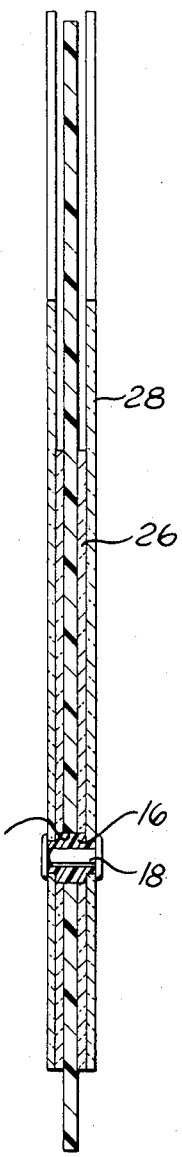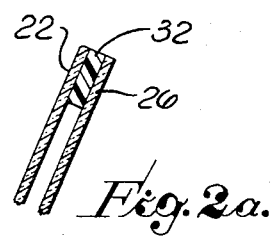

PATENTED MAY 8 1973  3,732,399

COMBINED OVAL SLIDE RULE AND NOMOGRAPH

BACKGROUND OF THE INVENTION

1. Field of the Invention

The invention relates in general to calculating devices, and more particularly, to a device for computing the monetary rate of payment of a loan for a given interest rate and loan duration as well as a calculating device which provides increased accuracy.

2. Description of the Prior Art

Known prior art includes U.S. Pat. No. 1,207,439, U.S. Pat. No. 2,478,098 and U.S. Pat. No 3,084,858.

In conventional-type slide rules utilized for rapid numerical calculations primarily for multiplication and division, the slide rule is in the form of a ruler. The ruler comprises a pair of members having a logarithmic scale on each of the members. Multiplication and division are normally performed by utilizing the logarithmic scales in a conventional technique which amounts to addition and subtraction of logarithms, respectively. When the answer to a multiplication or division results in the answer being "off the scale," it is necessary to shift one of the members with respect to the other member. The resultant effect is an extra step required in movement of the slide rule. To overcome such shifting, it has been found that a circular-type slide rule provides the same basic information, yet a shifting of the scale with respect to the other scale is not needed. However, it has been found that in order to obtain a desired amount of accuracy from a circular-type slide rule, it is necessary to provide a design of such size as to limit its practical usefulness.

SUMMARY OF THE INVENTION

In order to overcome the disadvantages of prior art circular or continuous type slide rules, the present invention provides a continuous-type readout arrangement not otherwise found on a linear-type slide rule. The invention provides an accuracy obtained by a ruler-type slide rule but without the necessity of shifting scales. In a specific example, the present invention may be used to determine the amount of periodic payment necessary in borrowing money for a given period of time and at a given interest rate.

More particularly, the invention comprises a calculating device formed of a flat oval-shaped card member. The perimeter of the card member defines generally semicircular sections at opposite ends thereof which are connected by a central elongated section having a generally straight periphery. A pair of indicating arms are rotatable about a pivot point on the card member. The pivot point may be along the longitudinal axis of the member, and offset from the center of the card member. In addition, a scale may be printed adjacent to the periphery of the card member and on one side of the member. Further, a reciprocal scale may be printed on the opposite side of the card member for rapidly determining the reciprocal of the number of the other side of the scale. Moreover, the semicircular sections may be identical in size. In addition, the card member may have a nomograph imprinted thereon, comprising a plurality of loan duration curves which are juxtaposed to a plurality of interest rate curves. By utilizing one of the indicating arms, the monetary payments necessary for a given interest rate at a given loan duration may be read directly on the scale.

The advantage of the invention, both as to its construction and mode of operation, will be readily appreciated as the same becomes better understood by reference to the following detailed description when considered in connection with the accompanying drawings, in which like reference numerals designate like parts throughout the figures.

BRIEF DESCRIPTION OF THE DRAWINGS

FIG. 1 depicts a front plan view of the calculating device of the invention;

FIG. 2 illustrates a sectional view of the calculating device of FIG. 1 taken along the lines 2—2 of FIG. 1;

FIG. 2a shows a sectional view of a portion of a calculating device of FIG. 1 taken along the lines 2a—2a of FIG. 1;

DESCRIPTION OF THE PREFERRED EMBODIMENT

Figure 3:
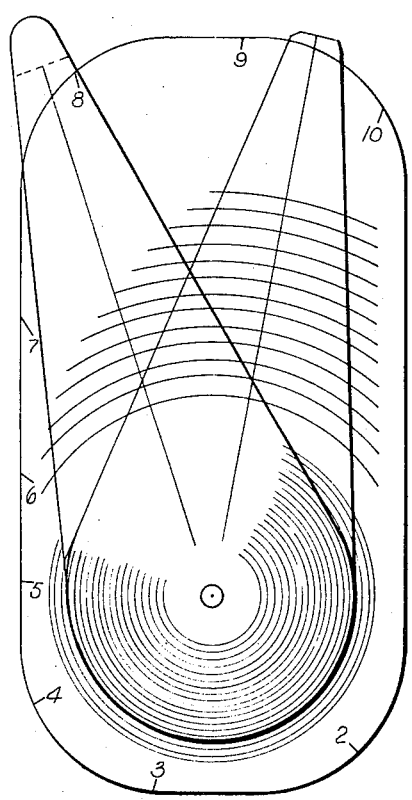
FIG. 3 depicts a plan view of the back face of the calculating device shown in FIG. 1.

Referring now to the drawings there is shown in FIG. 1 a preferred embodiment of the calculating device made in accordance with principles of the invention. The calculating device comprises a base card member 12. Positioned along the periphery of the card are the numbers 10 through 90. As is conventional in a circular-type slide rule, the number 10 represents the numeral 1 as well as 0.

Referring now to FIG. 2, the card contains an opening 14 therethrough into which a bushing 16 is inserted. Rotatably mounted on the bushing and secured thereto by means of a rivet 18 is an inner transparent indicia device 22 and an outer transparent indicia device 24. Similarly, on the other side of the card there is positioned an inner transparent indicia device 26 and an outer transparent indicia device 28. Each of the indicia devices 22, 24, 26 and 28 have a central hairline thereon. In addition, as can be seen in FIG. 2a, the inner indicia devices 22 and 26, are secured to each other by means of a tab member 32 which interconnects the ends thereof. Alternatively, of course, other securing means can be used to secure the inner devices 22 and 26 together. The tab member 32 is sufficiently near the end of the inner members 22 and 26 so that the members can be rotated 360 degrees around the card 12 with clearance provided between the card and the member 32.

The card 12 includes a first end section 42 and a second end section 44 both of which are generally semicircular respectively just before the number 10 through just past the number 13 and from slightly past the number 20 to approximately the number 60. However, the edges of the sections 42 and 44 adjacent the centerline of the card along its longitudinal axis, has been straightened for compactness. Interconnecting these two sections is a generally rectangular section 46. The card as shown in FIG. 1 has at its periphery, a generally logarithmic notation with the scale of numbers running from 10 around the perimeter of the card back to 10.

The top half of the card contains a first nomograph of a plurality of time lines representing periods of time. For example, the years 11 through 50 are represented by the curved lines bending toward the top right of the card 12 as shown in FIG. 1. In addition a plurality of curved arcs labeled 9, 10, 11 and 12 transversely intersect the time lines and represent percentage interest rates corresponding to the label numbers. Similar scales are also provided in the lower half of the card with the percentage interest rates generally being radii formed outwardly from the rivet 18. The scale on the lower half of the card can be used for calculating periodic payments for a relatively small number of years, e.g., from 9 years through 10 years while the top half of the card is better adapted to years 11 through 50 years as will be explained hereinafter.

Figure 4:
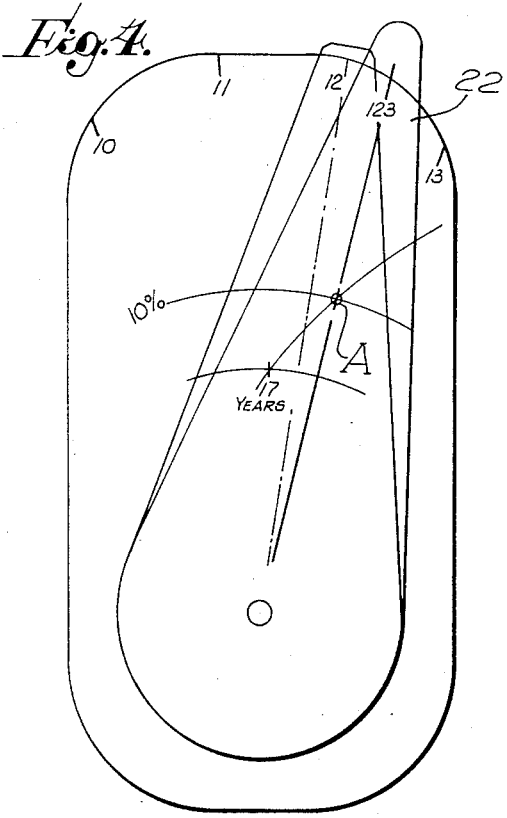
FIG. 4 illustrates a plan view of a calculating device shown in FIG. 1 for a specific predetermined example.

To use the device of FIG. 1 to calculate the periodic payments on a loan, the indicia device 22 is moved so that its hairline is placed on the interest rate and the duration of the loan. As an example, as can be seen in FIG. 4, should it be desired to determine the annual payments for a 17-year loan at 10 percent interest, the indicia device 22 is moved to the intersection of the 10 percent interest rate line and the 17-year repayment line which is noted as point "A" in FIG. 4. The central hairline on the transparent indicia member 22 will then be at the number on the outer perimeter log scale, shown as 123. This would inform the operator what the cost in terms of principal and interest of such a loan would be per $1,000 dollars of loan.

Figure 5:
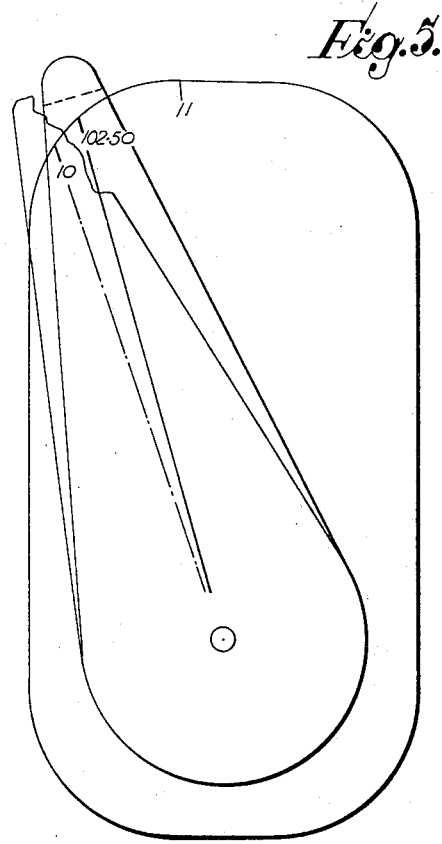
FIG. 5 shows a plan view of the calculating device of FIG. 4 with the indicia arms moved for the specific example illustrated.

To determine the amount of payments under loan in the foregoing example on a monthly basis, it is necessary to move the indicating device 24 to the position where the hairline is on the number 12 as shown in FIG. 4, while the indicia device 22 is forced to remain at the number 123. The securement of the indicia devices 22 and 24 by the rivet 18 is such that movement of one of the devices would normally cause the other device to move therewith unless sufficient force is exerted on the other device. Thereafter, both members are moved simultaneously to a position shown in FIG. 5 where the device 24 hairline is at the 10 position. At this point, the indicia device 22 is at the 102.5 position which indicates that the monthly payment of an annual payment of $123 per thousand dollar repayment would be $10.25.

As can be seen in FIG. 3, the back side of the card 12 contains the reciprocal of the numbers printed on the front side of the card 12. Since the indicia devices 22 and 26 are connected in tandem by means of the member 32, movement of the indicia member 22 allows rapid reading of the reciprocal number on the opposite side of the card.

The increased expanse provided by the present elongate construction enables nomographs to be printed on the surfaces of the calculator and used in conjunction with the indices. In addition, as can be readily seen, use of the indices 22 and 24 or the indices 26 and 28 allow the card to operate in a normal slide rule fashion with conventional multiplication and division performed thereon. Moreover, by utilizing a pivot point on the calculating device located at the bottom third thereof, the scale running to the top end of the card is greatly exaggerated which has the affect of increasing the accuracy at that portion of the scale. This pivot point is located along the longitudinal axis of the card, and offset from the center of the card. The effect of this increase is more dramatically shown on the reverse side of the card where the log scale is shown in an inverse manner as in FIG. 3. Note that the higher portions of the log scale, which are normally condensed in both a circular and ruler slide, are exaggerated by the present construction, allowing a greater accuracy and less differential in accuracy between the low and high ends of the scales.

While the elongated card has been shown in connection with a loan payment calculator, it should be understood, of course, that any of a variety of other nomographs are possible. It should be further understood that the foregoing disclosure relates only to preferred embodiments of the invention, and that it is intended to cover all changes and modification of the examples of the invention herein which do not constitute departures from the spirit and scope of the invention.

I claim:

1. A calculating device comprising a flat elongated card member having a perimeter defining a central section interconnecting a pair of end sections and a first indicating device rotatable about a pivot point on said member and offset from the center thereof, a first scale printed adjacent the periphery of said member and on one side of said card member, a second scale printed on a side of said elongated card member opposite said one side and adjacent the periphery of said card member, said second scale being inverse of said first mentioned scale, a second indicating device having the same pivot point as said first indicating device, and means for moving said indicating devices in tandem for simultaneously reading information on said first scale and the reciprocal thereof on said second scale.

2. A calculating device in accordance with claim 1 wherein said indicating devices are mounted on opposite sides of said card.

3. A loan payment calculator for determining the payments due on a loan for a given periodic repayment interval comprising:
   a card member having a plurality of interest rate curves thereon;
   said card member also having a plurality of loan duration curves thereon in juxtaposition to said interest rate curves;
   a scale position on said card member representative of money payments;
   a movable indicator device having an indicator line thereon, movement of said indicator line to a point representing the intersection of a given interest rate and a given loan duration resulting in the indicator line being simultaneously at the monetary payment for said given interest rate and said loan duration as indicated on said scale; and
   means for converting said payment from a first periodic payment interval to a second periodic payment interval.

4. A calculating device comprising a flat elongated card member having a perimeter defining a central section interconnecting a pair of end sections, a first indicating device rotatable about a pivot point on said member and offset from the center thereof; and a second indicating device having the same pivot point as said first indicating device, and means for moving said indicating devices in tandem, said indicating devices being mounted on the same side of said card, and wherein said devices are movable to perform multiplication and division functions.

5. A loan payment calculator for determining the payments due on a loan for a given periodic repayment interval comprising:

a card member having a plurality of interest rate curves thereon;

said card member also having a plurality of loan duration curves thereon in juxtaposition to said interest rate curves;

a scale position on said card member representative of money payments;

a first movable indicator device having an indicator line thereon, movement of said indicator line to a point representing the intersection of a given interest rate and a given loan duration resulting in the indicator line being simultaneously at the monetary payment for said given interest rate and said loan duration as indicated on said scale, and a second movable indicator device for converting said payments from a first periodic payment interval of time to a second periodic payment interval of time.

* * * * *